(12) United States Patent
Dickenson et al.

(10) Patent No.: US 8,966,322 B2
(45) Date of Patent: Feb. 24, 2015

(54) AUTOMATED TESTING OF HOT SWAP SCENARIOS OF FIELD REPLACEABLE UNITS IN A STORAGE SYSTEM

(71) Applicant: International Business Machines Corporation, Armonk, NY (US)

(72) Inventors: Gary I. Dickenson, Tuscon, AZ (US); Richard Hutzler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 13/736,491

(22) Filed: Jan. 8, 2013

(65) Prior Publication Data

US 2014/0195859 A1   Jul. 10, 2014

(51) Int. Cl.
*G06F 11/00* (2006.01)
*G06F 11/07* (2006.01)
*G06F 11/273* (2006.01)
*G06F 11/18* (2006.01)

(52) U.S. Cl.
CPC .......... *G06F 11/0745* (2013.01); *G06F 11/273* (2013.01); *G06F 11/183* (2013.01)
USPC .......................................................... 714/43

(58) Field of Classification Search
CPC . G06F 13/4081; G06F 3/0635; G06F 9/4411; G06F 11/273; G06F 11/183
See application file for complete search history.

(56) References Cited

U.S. PATENT DOCUMENTS

| | | | |
|---|---|---|---|
| 5,579,491 A * | 11/1996 | Jeffries et al. | 710/302 |
| 6,252,514 B1 * | 6/2001 | Nolan et al. | 340/686.4 |
| 6,577,507 B2 | 6/2003 | Yamaguchi et al. | |
| 6,988,157 B2 * | 1/2006 | Lecourtier | 710/302 |
| 7,281,076 B2 * | 10/2007 | Yates et al. | 710/305 |
| 7,774,073 B2 * | 8/2010 | Cane et al. | 700/3 |
| 2004/0230866 A1 * | 11/2004 | Yates et al. | 714/25 |
| 2009/0043919 A1 | 2/2009 | Takimoto | |
| 2009/0046419 A1 | 2/2009 | Drake et al. | |

* cited by examiner

*Primary Examiner* — Charles Ehne
(74) *Attorney, Agent, or Firm* — Eric A. Gifford

(57) ABSTRACT

System and method for automated testing of hot swap scenarios of field replaceable units (FRUs) in a storage system comprises an external automation server that distributes control signals to actuation systems within a number of FRUs. Power for the actuation systems may be provided by the external automation server or by self-contained power supplies with each actuation system. The actuation systems are responsive to the control signals to move the storage devices back-and-forth thereby electrically and physically disconnecting the storage device's mating connector from the backplane connector. This approach provides a high degree of automation while closely emulating customer hot swap scenarios.

20 Claims, 5 Drawing Sheets

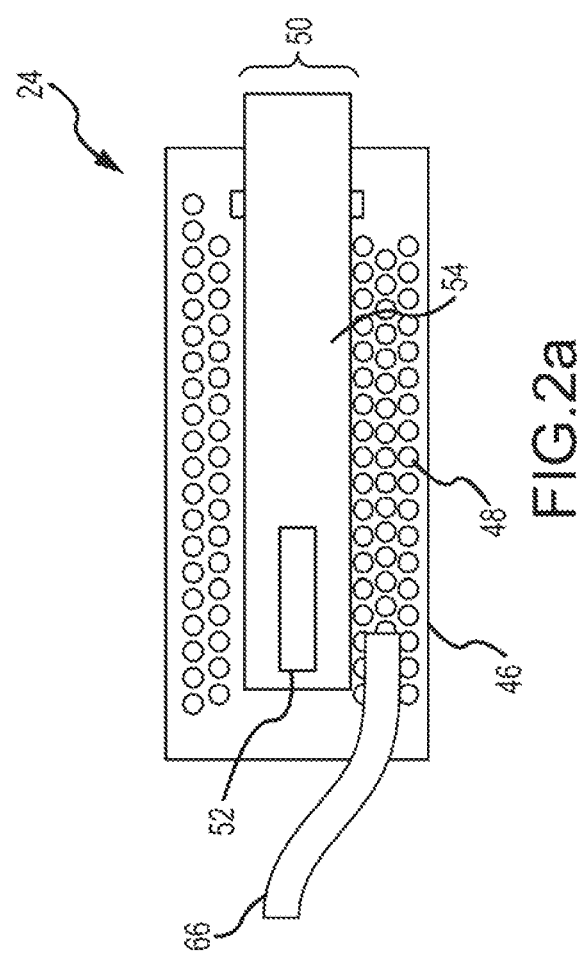

AUTOMATED TESTING OF HOT SWAP SCENARIOS OF FIELD REPLACEABLE UNITS IN A STORAGE SYSTEM

BACKGROUND

1. Field of the Invention

The present invention relates to storage systems, and more specifically, to an automated test system for hot swappable field replaceable units (FRUs) in the storage system to test hot swap failure scenarios.

2. Description of the Related Art

Storage Systems such as the IBM DS8000 and XIV provide configurable systems for storing computer data. An exemplary storage system includes a rack that provides the physical frame to receive power, processing, storage, networking and other enclosures and one or more backplanes each having one or more connectors. The power enclosure includes one or more power supplies that draw power from the wall and provide the various power supplies required by different components of the storage system and the backplane. The storage enclosures each include a number of field replaceable units (FRUs) with mating connectors that plug into respective connectors on one or more backplanes. Each FRU includes a latch mechanism (e.g. a catch and lever) for physically locking and unlocking the FRU so that it may be replaced in the field. The processing enclosures each include one or more processing boards, which each include one or more central processing units (CPUs). The CPUs are in electrical communication with the backplane via cables or connectors. All power, data and control signals to and from the FRU's storage device hard disk drive (HDD), solid state drive (SDD) such as a flash memory card, and magnetic tape drive) pass through its mating connector. The network enclosure includes a networking switch that facilitates communication between the CPUs and the backplane(s). In some systems the function of the networking switch may be built into the processing boards. The storage system also has one or more network ports (e.g. Ethernet) on the network switch or other components to connect the storage system to an external network.

In the context of storage systems, the term "hot swapping" is used to describe an event of either removing or inserting a FRU from the storage system while the system is powered and operational. Hot swapping is commonly used to change the configuration of or repair a working storage system without interrupting its operation. In most storage networks it is simply not feasible to shutdown the storage system taking it out of operation to remove or replace a FRU. Furthermore, "hot swap" events typically occur without giving any notice to or preparing the storage system for the hot swap event. FRUs and the storage system are designed to support hot swapping.

Storage systems are designed to recognize the occurrence of a hot swap event and to execute the necessary steps in response to the hot swap event to, for example, reconfigure the system in the absence of a particular FRU or to recognize and incorporate a new FRU that expands storage capacity. The storage system's CPUs will generate system message traffic to recognize the hot swap event and to take the necessary steps in response to that event.

Hot swapping can produce a variety of failure scenarios it powered and operational storage systems. Failure scenarios that have occurred include a total system crash resulting in loss of service events, data loss, loss of access to parts of the storage system, backplane failure and failure of storage devices during FRU replacement.

Storage system vendors and storage device manufacturers appreciate the need to rigorously test hot swapping of the FRUs in the storage systems under many different scenarios to test both the design of a storage system and the operation of as particular storage system prior to customer delivery. The vendors and manufacturers want to ensure that the storage system responds to various hot swap scenarios properly and as designed and that and failure scenarios are limited. Testing essentially involves connecting and disconnecting FRUs, and particularly the storage device, from the backplane connector and monitoring the message traffic generated by the storage system to collect diagnostic test data.

Vendors currently use a variety of different techniques to connect and disconnect the FRUs. One approach is to have a person physically remove or insert the FRU. This approach allows for considerable flexibility and most closely emulates the conditions of a customer hot swap event. However this approach is labor intensive, slow, costly and limits the extent to which various failure scenarios can be practically tested. Another approach is to have a robot or robotic arm physically remove or insert the FRU. This approach is similar to the manual approach and can be automated for more extensive test procedures. However, robotic systems have a high initial cost and high cost to maintain. Another approach is to install an electronic interface card inside the FRU between the storage device and the mating connector. This approach can be easily integrated into an automated test system and allows for extensive and diverse testing. However, this approach only connects and disconnects the storage devices electrically not physically. Furthermore, the presence of the interface card between the storage device and mating connector may affect this or other tests. The card must be removed before the storage system is delivered so that the tested system is not the same as the as-delivered system. Another approach is to simulate the hot swap events in software causing the storage system to think a hot swap event has occurred and to respond accordingly. This approach be easily integrated into an automated test systems and allows for extensive and diverse testing. However, this approach does not simulate the physical and electrical stresses inherent in physically removing or inserting a FRU.

BRIEF SUMMARY

To improve testing of hot swap scenarios to achieve greater storage performance and reliability for customers, a variety of improvements to storage environments continue to be made.

According to one embodiment of the present invention, an automated test system for hot swapping field replaceable units comprise a storage system having one or more backplanes, each backplane having one or more connectors, one or more processing hoards in electrical communication with the one or more backplanes, each board having at least one central processing unit (CPU), one or more power supplies that supply power to the one or more backplanes and the processing hoards, and one or more field replaceable units (FRUs). Each FRU includes a carrier, a storage device, a mating connector for connection to one of the backplane connectors and a latch mechanism for physically locking and unlocking, the FRU. Under normal operation, all power, data and control signals to and from the storage device pass through its mating connector. The storage system operates autonomously without any knowledge of or preparation for a hot swap event.

In an embodiment, the automated test system includes one or more actuation systems within respective FRUs. Each actuation system is responsive to a hot swap control signal to move the storage device within the stationary and locked FRU to physically connect or physically disconnect its mating connector to or from the associated backplane connector to create a hot swap event while the storage system is powered and operational. An external automation test server is configured with an external power supply output that supplies test power and a control output that generates the hot swap control signal for each of the one or more FRUs. A number of cables connect the test server's external power supply output and control output to the actuation system in the one or more FRUs. The automation server monitors the system messages generated by the storage system to detect expected hot swap event messages and unexpected error messages associated with the hot swap event and stores the messages.

In an alternate embodiment, each actuation system is provided with it own self-contained power supply (e.g. a battery). Each actuation system includes a wireless receiver to receive the hot swap control signals wirelessly from the automation server.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which:

FIGS. 2a, 2b and 2c are respectively a front view, side section view and a plan view of an embodiment of an FRU configured to automatically disconnect and connect the memory devices from and to the backplane of the storage system.

DETAILED DESCRIPTION

Figure 1:
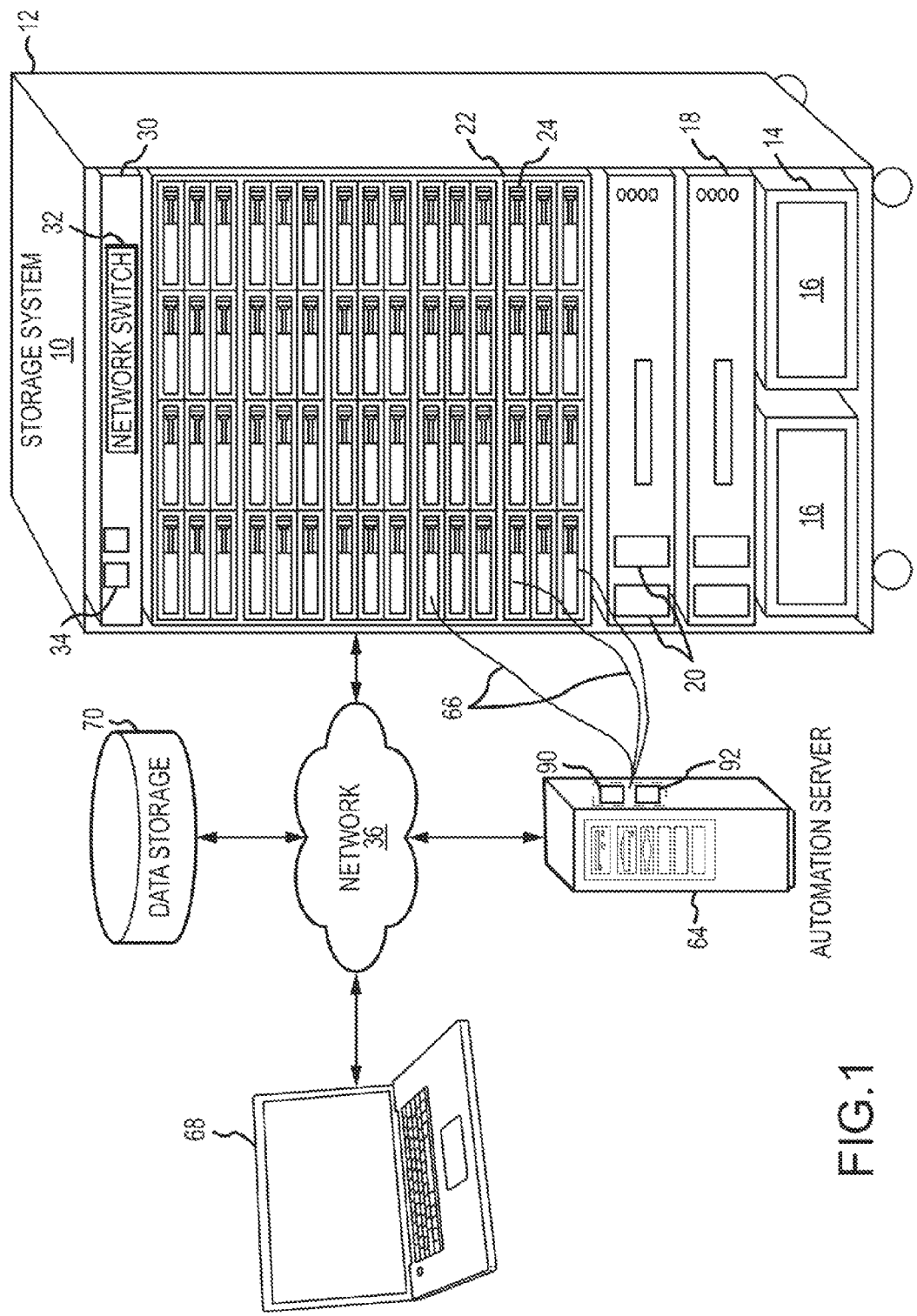
FIG. 1 is an embodiment of an automated test system for testing hot swap scenarios in a storage system in which selected FRUs have been configured to automatically disconnect and connect the memory devices under the control of an external automation server.
Figure 2B:
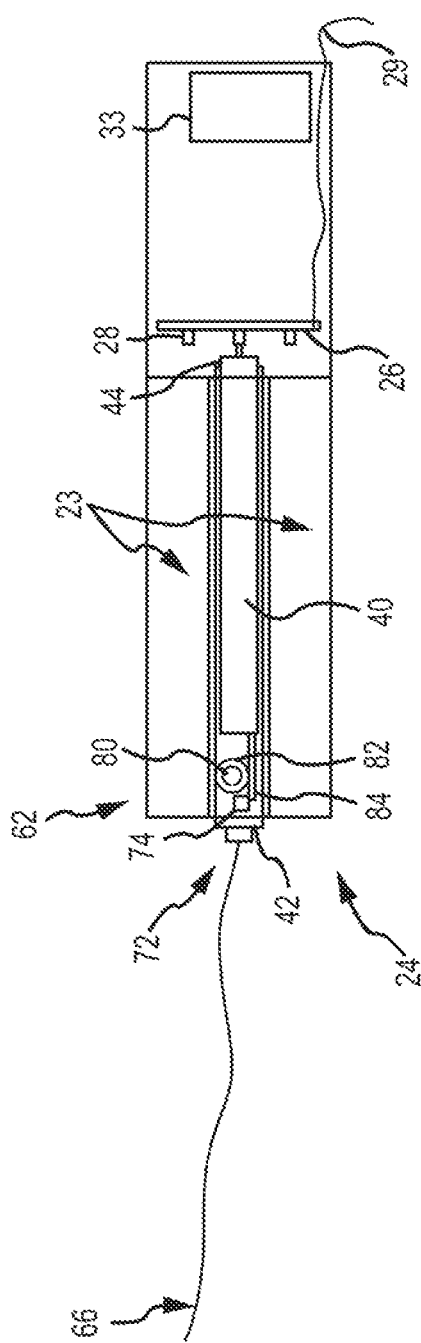
Figure 2C:
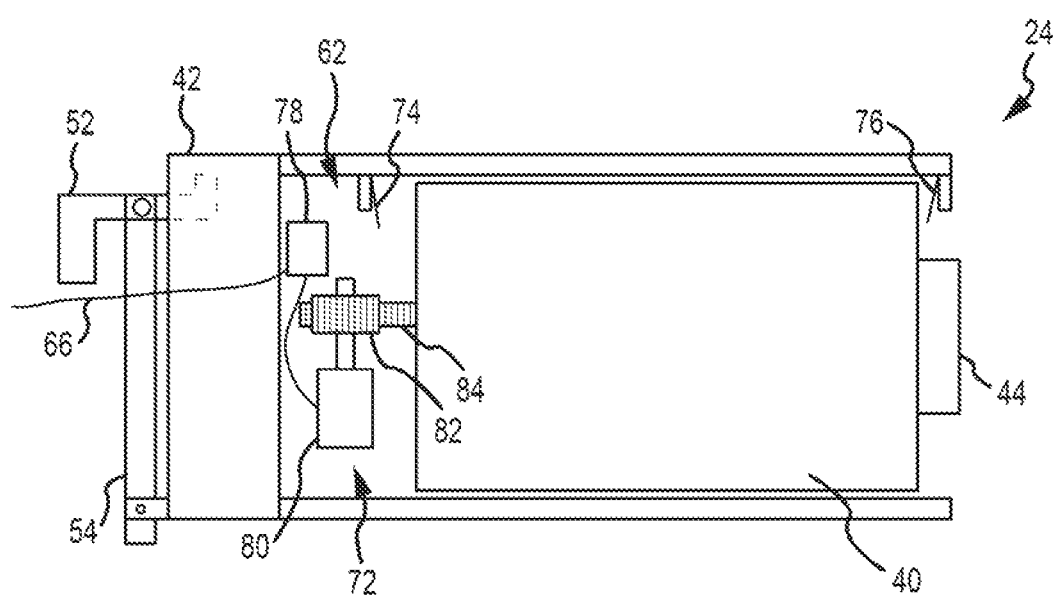

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As used herein a storage system includes one or more field replaceable units (FRUs). The storage system and FRUs are configured for easy removal and replacement by a technician in the field. As such, the storage system includes one or more backplanes each having; one or more connectors. Each FRU has a mating connector that physically and electrically connects a storage device (e.g. a hard disk drive (HDD, solid state drive (SDD) such as a flash memory card, a magnetic tape drive etc.) with the FRU to one of the backplane connectors. A latching mechanism such as a lever and catch serve to lock the FRU into the storage system and to facilitate easy removal of the FRU. Under normal operation of the storage system, all power, data and control signals to and from the storage device pass through the mating connector. Typical storage systems will include multiple FRUs that plug into associated connectors on one or more backplanes. Typical storage systems in also include other components such as power supplies. CPUs, network switches, external network connections and the like to power and operate the storage system.

The illustrated embodiments below describe a system and method for automated testing of hot swap scenarios for FRUs in a storage system under power and normal operating conditions, for example. The illustrated embodiments provide for automated testing in which the FRUs mating connector is both electrically and physically disconnected from the backplane connector to closely emulate the conditions of a customer hot swap event. The externally controlled automating testing, provides no warning to or ability of the storage system to prepare for a hot swap event, emulating the conditions of a customer hot swap event. The storage system operates autonomously from the automated testing procedures.

With reference now to FIGS. 1 and 2a through 2c, a storage system 10 such as the IBM DS8000 and XIV is configured to provide computer data storage at a customer site. The storage system must be tested "hot swapping" scenarios prior to delivery.

In an embodiment, storage system 10 includes a rack 12 that provides the physical frame to receive various modular enclosures. A power enclosure 14 includes one or more power supplies 16 that draw power from the wall and provide the various power supplies required by different components of the storage system. Each processing enclosure 18 includes one or more processing boards 20 with each board including one or more central processing units (CPUs). Each storage enclosure 22 includes multiple storage bays 23 each configured to receive a field replace unit (FRU) 24 that is electrically and physically connected to a backplane 26 via a backplane connector 28. The one or more backplanes 26 are connected to the processing boards via a connection cable 29. A network enclosure 30 includes a networking switch 32 that facilitates communication between the CPUs and the FRUs. Each of the enclosures is suitably provided with one or more fans such as fan 33 shown in storage enclosure 22. In some systems the function of the networking switch may be built into the processing boards. The storage system also has one or more network ports 34 (e.g. Ethernet) on the network switch or other components to connect the storage system 10 to an external network 36.

Each FRU 24 includes a storage device 40 (e.g. hard disk drive (HDD), solid state drive (SOD) such as a flash memory card, and magnetic tape drive), a carrier 42 in which the storage device 40 is mounted and a mating connector 44 for connection to one of the backplane connectors 28. In this embodiment, mating connector 44 is connected directly to storage device 40. In an alternate embodiment, mating connector 44 may be part of carrier 42 in which case a connector on the storage device would plug into one side of the mating connector, which would in turn plug into the backplane connector. A front panel 46 of the carrier is provided with vent holes 48 for venting heat. A latch mechanism 50 allows the FRU to be physically locked into the storage enclosure and unlocked and removed from the storage enclosure. A typical latch mechanism 50 includes a catch 52 that locks the carrier 42 to the enclosure and a lever 54 to force the carrier 42 to eject when catch 52 is opened. Under normal operation, all power, data and control signals to and from the storage device 40 pass through its mating connector 44.

An automated test system 60 for testing hot swapping scenarios of one or more of the FRUs 24 in storage system 10 includes an actuation system 62 positioned within each FRU 24 to be tested, an external automation server 64 that supplies test power and hot swap control signals and a number of cables 66 that route the test power and hot swap control signals from the external automation server 64 to the actuation systems 62 within the FRUs. Each actuation system is responsive to a hot swap control signal to move the storage device 40 within the stationary and locked FRU to physically connect or physically disconnect its mating connector 45 to or from the associated backplane connector 28 to create a hot swap event while the storage system 10 is powered and operational.

The test system 60 may also include one or more computer terminals 68, which may be considered to be part of the automation server, for creating an automated test plan of hot swap events to be implemented by external automation server 64 and a data storage 70 for storing system messages generated by the storage system in part in response to the occurrence of hot swap events. The automation server monitors the message traffic to detect anomalies and perform diagnostics of the hot swap scenarios.

In this embodiment, each actuation system 62 includes an actuator 72, first and second sensors 74 and 76 and a control board 78. Actuator 72 is configured to move the storage device 40 back-and-forth within carrier 42 to physically connect and disconnect mating connector 44 from its associated backplane connector 28. As shown, actuator 72 includes a stepper motor 80 and a rack and pinion gear 82 and 84. Motor 80 rotates a portion of gear 82, which engages another portion of the gear 84 that is connected to removable drive 40. Rotation of motor 80 produces a linear motion of the removable drive 40. The motor 80 drives removable drive 40 in one direction to connect mating connector 44 and in the opposite direction to disconnect mating connector 44. A range-of-motion of less than 1 cm is adequate to physically connect and disconnect the mating connector.

In alternate embodiments, actuator 72 may be configured as an electric motor and lever assembly, pulley/cable system or alternate gear assemblies such as worm-helical or screw-jack. Actuator 72 may comprise a solenoid in which a ferrous rod is surrounded by an electro-magnetic coil. When the coil is energized, the ferrous rod will move through the coil. Actuator 72 may comprise a ferrofluid that reacts to an applied magnetism to contract and extend to move the storage device back-and-forth. Actuator 72 could be configured as an electro-active polymer to contract and extend in response to an applied electric field. The invention contemplates the use of many different actuators to move the storage device back-and-forth to connect and disconnect its mating connector.

First and second sensors 74 and 76 are configured to sense whether the storage device's mating connector 44 is disconnected or connected, respectively. First sensor 74 venerates a connected signal if the storage device's mating connector is connected to the backplane connector. Second sensor 76 generates a disconnected signal if the storage device's mating, connector is disconnected from the backplane connector. If functioning properly, one and only one of the two signals should be activated. These signals are provided to control board 78. In this embodiment, the sensors comprise limit switches that are activated when storage device 40 is driven into contact with the switch. The switches are positioned such that contact with storage device 40 indicates whether its mating connector 44 is connected or disconnected.

Control board 78 is connected to cable 66 to receive test power and the hot swap control signals from the external automation server and is connected to sensors 74 and 76 to receive the disconnect and connect signals. Control board 78 compares the hot swap control signal to the state of the storage drive, connected or disconnected to determine whether to activate or deactivate the motor. Implementation of a control board and position sensors reduces power consumption, avoids damage to the storage device and motor and ensures the drive is in the position dictated by the external automation server.

In an alternate embodiment, the actuation system could be implemented with only the actuator 72 and the control board 78. In this configuration, the control board would assume the storage device is where it is supposed to be and that activation of the motor in response to a hot swap control signal properly connects or disconnects the storage device's mating connector.

In an alternate embodiment, the actuation system could be implemented with only the actuator 72. In this configuration, the external automation server 64 would supply the test power and hot swap control signal directly to the actuator 72 via cable 66.

External automation test server 64 is configured with an external power supply output 90 that supplies test power and a control output 92 that generates the hot swap control signal for each of the one or more FRUs. The test power is suitably a DC voltage sufficient to power the control board and motor in the FRUs wider test. The hot swap control signal may be a simple two-state signal connect disconnect, in which case the control board either simply drives the motor to that state regardless or compares the signal to the current state of the storage device and drives the motor accordingly. Alternately, the hot swap control signal may be a three-state signal; connect, disconnect or no action, in which case the control board would only drive the motor upon receipt of a connector or a disconnect state.

In most implementations the power and hot swap control signals are separate signals that are provided on separate wires or "pins" within the cable connecting the external automation server 64 to the control board 78 inside the FRU. For example, a USB cable could be used to provide both power and control signals. In some implementations it may be possible to combine test power and the hot swap control signal into a single signal to drive the actuator, in effect a switched power signal.

The external power supply output 90 that supplies test power and the control output 92 that generates the hot swap control signal may be configured and addressed in a variety of ways to provide power and control signals to the one or more FRUs under test. In one configuration, the external automation server would have N power supply outputs 90 and N control outputs 92. A cable would connect a power output and a control output to one of the FRUs. For example, the server may have N USB outputs that provide power and control signal. During setup, a technician would assign the connected FRU identifier to the output. In another configuration, the external automation server might have only a single power output 90 and a single control output 92. A 1-to-N router with a single power and control input and N power and N control outputs would be connected to the external automation server and N cables would be connected from the router to the N FRUs. The automation server and router would have to implement a simple addressing scheme to map control signals to the appropriate FRUs. In another configuration, the external automation server might have only a single power output 90 and a single control output 92 and connect the N FRUs in a "daisy chain". The automation server would again have to implement a simple addressing scheme to map control signals to the appropriate FRUs.

The external automation server both implements a hot swap test plan via the provisioning of test power and the hot swap control signals and monitors the system messages generated by the storage system to evaluate the storage system's response to various hot swap scenarios.

The test plan is essentially a script that specifies when to generate hot swap control signals to connector or disconnect the storage device in a particular FRU. The test plan may test the hot swapping, of each FRU individually, replacement of the FRU within different time windows, the simultaneous or near simultaneous hot swapping of multiple FRUs, the hot swapping of a certain sequence of FRUs, random hot swapping of different FRUs etc. The test plan is essentially no different than might be implemented by a technician or a robot pulling FRUs to physically disconnect the storage device but can be implemented at a much higher level of automation as it is much simpler to move the storage device back-and-forth than it is to physical remove and than replace the entire FRU.

The storage system generates system messages under normal powered operation. If the storage system detects a hot swap event, either removing a connected FRU or inserting, a new FRU it a bay, the storage system will generate one or more event messages in response to the occurrence of the hot swap event to, for example, identify the occurrence of the event and to describe actions taken by the system in response thereto and may generate one or more error messages if there is problem with the hot swap. The message traffic is output via the network port 34 and stored in data storage 70. The external automation server parses the message traffic looking for both expected event messages, the absence of expected event messages and unexpected error messages associated with a hot swap event. The external automation server stores the test plan and parsed message traffic in data storage 70 for analysis. Upon detecting any unexpected error messages, the automation server may trigger the collection of other diagnostic data to assist with the analysis of the failure.

In an alternate embodiment, each actuation system 62 is provided with a self-contained power supply such as a battery or via energy harvesting techniques. The control board 78 is provided with a wireless receiver such as WiFi or Blue Tooth to receive the hot swap control signals over a wireless channel from the external automation server, which is provided with a wireless transmitter. These modifications remove the requirement for an external power supply and physical cables to route power and control signals from the automation server to the FRUs under test.

In either of the described embodiments, test power and the hot swap control signals are not provided to the storage device via its mating connector.

Once hot-swap testing is completed on the storage system 19, the actuation systems including the control board 78, motor 80 and gears 82, 84 and sensors 74, 76 are suitably removed from the FRUs 24 prior to customer delivery. The storage system is considered to be "delivered as tested". None of these elements are in the path of power, data or control.

Figure 3:
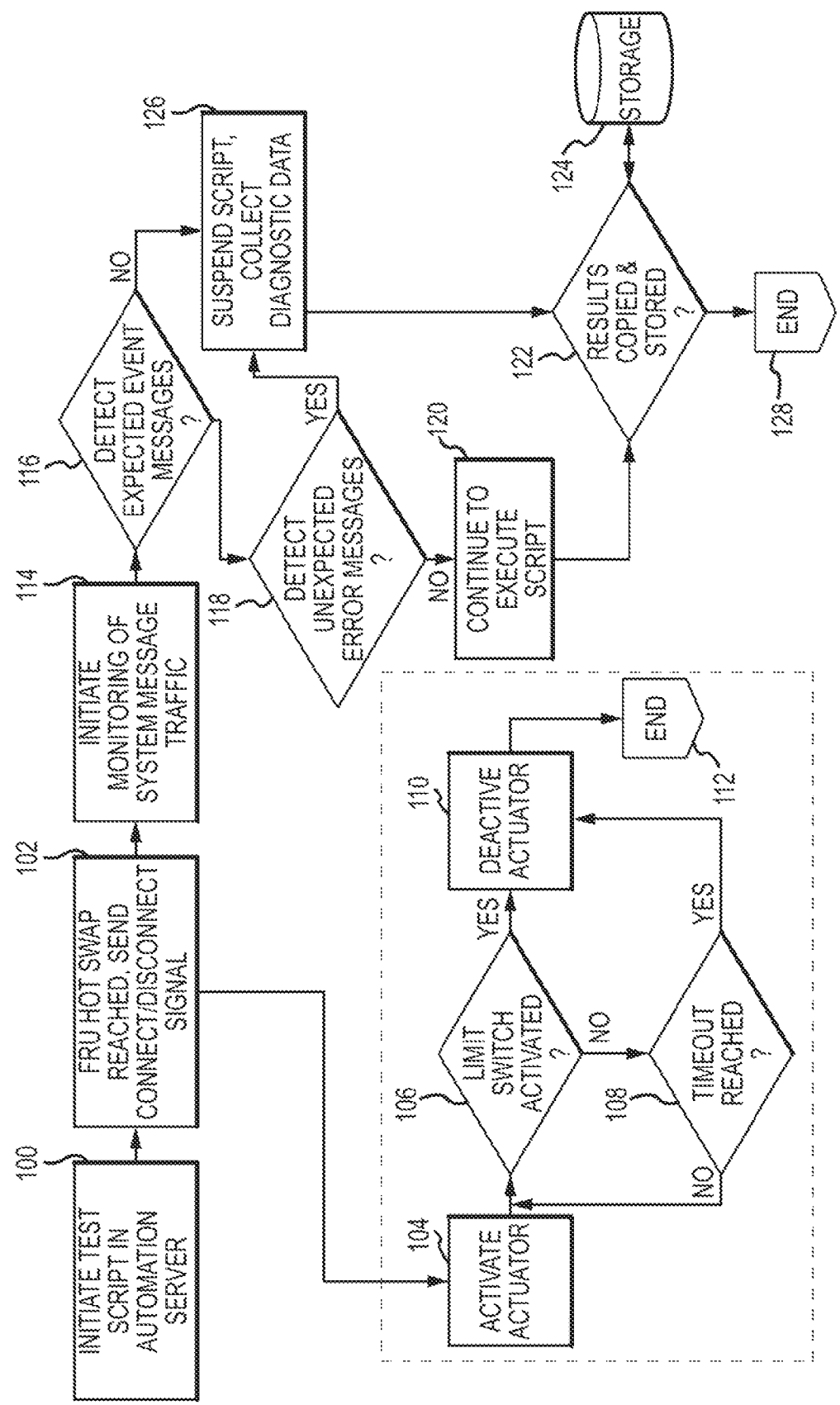
FIG. 3 is a flow diagram of an embodiment of an automated process for testing hot swap scenarios.

With reference to FIG. 3, in an embodiment of an automated test procedure for testing hot swapping scenarios, the external automation server initiates a test script (step 100). When the test script reaches an FRU hot swap event, the automation server sends a connect/disconnect signal to the identified FRU (step 102). The actuation system's control board receives the signal and activates the actuator (step 104) to move the storage device. ° The control board checks to see if the limit switch for the directed action is activated (step 106). The control board mains activation of the actuator until the limit switch is activated (step 106) or a time out for connecting or disconnecting the storage device is reached (step 108) at which time the control board deactivates the actuator (step 110) and ends (step 112).

The automation server initiates monitoring of the storage system message traffic (step 114). The server parses the system message to detect expected event messages (step 116) such as an initial message that detects the hot swap event and subsequent messages in response to the event and to detected unexpected error messages (step 118). If the message traffic is as expected, the automation server continues to execute the script (step 120). The results are copied and stored (step 122) in data storage 124. If the message traffic is not as expected such as the absence of an expected event message or the presence or certain error messages, the automation server may (or may not) suspend execution of the script and initiation collection of other diagnostic data for analysis (step 126). The results are copied and stored (step 122) in data storage 124. Once the script is completed or suspended, the process ends (step 128)

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" and/or "Comprising," when used in this specification, specify the presence of stated features, integers steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. An automated test system for hot swapping field replaceable units in a storage system, comprising:
    a storage system, comprising:
        one or more backplanes, each backplane having one or more connectors;
        one or more processing boards in electrical communication with the one or more backplanes, each board having at least one central processing unit (CPU);
        one or more power supplies that supply power to the one or more backplanes and the processing boards; and
        one or more field replaceable units (FRUs), each FRU including a carrier, a storage device, a mating connector for connection to one of the backplane connectors and a latch mechanism for physically locking and unlocking the FRU, wherein all power, data and control signals to and from the storage device pass through its mating connector while the storage system is powered and operational,
    one or more actuation systems within respective FRUs, each actuation system responsive to a hot swap control signal to move the storage device within the stationary and locked FRU to physically connect or physically disconnect its mating connector to or from the associated backplane connector to create a hot swap event while the storage system is powered and operational;
    an automation test server external to said storage system, said test server configured with an external power supply output that supplies test power and a control output that generates the hot swap control signal for each of the one or more actuation systems; and
    a number of cables that connect the test server's external power supply output and control output to the actuation system in the one or more FRUs.

2. The automated test system of claim 1, wherein said storage system operates autonomously without any knowledge of or preparation for a hot swap event.

3. The automated test system of claim 1, wherein the powered and operation storage system generates system messages, said automation test server monitoring said messages for expected hot swap event messages and unexpected error messages associated with the hot swap event and storing the expected and unexpected messages in storage.

4. The automated test system of claim 1, wherein a first plurality of FRUs are provided with a second plurality of actuation systems less than or equal to the first plurality, wherein at least one said cable is connected between the automation server and each said actuation server to provide test power and hot swap control signals to each said actuation system.

5. The automated test system of claim 4, wherein each said actuation system comprises:
    an actuator coupled to the storage device;
    a controller that is connected to the cable to receive the test power and hot swap control signal, said controller configured to supply power and a drive signal to the actuator to move storage device to connect or disconnect its mating connector.

6. The automated test system of claim 5, wherein each said actuation system further comprises:
    a first sensor configured to generate a connected signal if the storage device's mating connector is connected to the backplane connector; and
    a second sensor configured to generate a disconnected signal if the storage device's mating connector is disconnected from the backplane connector.

7. An automated test system for hot swapping field replaceable units in a storage system, said storage comprising one or more backplanes, each backplane having one or more connectors and one or more field replaceable units (FRUs), each FRU including a carrier, a storage device, a mating connector for connection to one of the backplane connectors and a latch mechanism for physically locking and unlocking the FRU, wherein all power, data and control signals to and from the storage device pass through its mating connector while the storage system is powered and operational, said automated test system, comprising:
    one or more actuation systems within respective FRUs, each actuation system responsive to a hot swap control signal to move the storage device within the stationary and locked FRU to physically connect or physically disconnect its mating connector to or from the associated backplane connector to create a hot swap event while the storage system is powered and operational;
    a power supply that supplies test power to the one or more actuation systems;
    an automation test server external to said storage system, said test server configured with a control output that generates the hot swap control signal for each of the actuation systems; and
    a communication channel that distributes the hot swap control signals from the external automation server to the actuation systems.

8. The automated test system of claim 7, wherein said power supply is within said automation server, said automation server configured with an external power supply output that supplies test power, further comprising:
    a number of cables that connect the test server's external power supply output and control output to the actuation systems to supply test power and to provide the communication channel for distributing the hot swap control signals.

9. The automated test system of claim 7, wherein said power supply comprises a self-contained power supply with each said actuation system within the associated FRU.

10. The automated test system of claim 9, wherein said communication channel is a wireless communication channel, said automation server comprises a wireless transmitter for transmitting the hot swap control signals over the wireless communication channel and each said actuation system comprises a wireless receiver for receiving the hot swap control signals.

11. The automated test system of claim 7, wherein said storage system operates autonomously without any knowledge of or preparation for a hot swap event.

12. The automated test system of claim 11, wherein the powered and operation storage system generates system messages, said automation test server monitoring said messages for expected hot swap event messages and unexpected error messages associated with the hot swap event and storing the expected and unexpected messages in storage.

13. The automated test system of claim 11, wherein a first plurality of FRUs are provided with a second plurality of actuation systems less than or equal to the first plurality, wherein at least one said cable is connected between the automation server and each said actuation server to provide test power and hot swap control signals to each said actuation system.

14. The automated test system of claim 7, wherein each said actuation system comprises:
 an actuator coupled to the storage device;
 a controller that is connected to the cable to receive the test power and hot swap control signal, said controller configured to supply power and a drive signal to the actuator to move storage device to connect or disconnect its mating connector.

15. The automated test system of claim 14, wherein each said actuation system further comprises:
 a first sensor configured to generate a connected signal if the storage device's mating connector is connected to the backplane connector; and
 a second sensor configured to generate a disconnected signal if the storage device's mating connector is disconnected from the backplane connector.

16. A method for automated testing of hot swap events, comprising:
 providing a storage system having one or more backplanes, each backplane having one or more connectors, and one or more field replaceable units (FRUs), each FRU including a carrier, a storage device, a mating connector for connection to one of the backplane connectors and a latch mechanism for physically locking and unlocking the FRU, wherein all power, data and control signals to and from the storage device pass through its mating connector while the storage system is powered and operational;
 providing power, data and control signals to operate the storage system;
 providing one or more of the FRUs with an actuation system configured to move the storage device to physically connect or physically disconnect its mating connector to or from the associated backplane connector;
 providing test power for the actuation systems in the one or more FRUs;
 providing hot swap control signals for each the actuation system external to the storage system;
 communicating the hot swap control signals to the actuation systems within the one or more FRUs; and
 responsive to said hot swap control signals, the one or more actuation systems moving the storage device within the stationary and locked FRU to physically connect or physically disconnect its mating connector to or from the associated backplane connector to create a hot swap event while the storage system is powered and operational.

17. The method of claim 16, wherein said storage system operates autonomously without any knowledge of or preparation for a hot swap event.

18. The method of claim 17, wherein the storage system generates system messages, further comprising:
 monitoring said messages for expected hot swap event messages and unexpected error messages associated with the hot swap event; and
 storing the expected and unexpected messages in storage.

19. The method of claim 17, wherein said test power is provided external to said storage system, further comprising:
 routing via cables the power and hot swap control signals to the one or more actuation systems within the FRUs.

20. The method of claim 17, wherein said test power is provided by a self-contained power supply with each said actuation system within the associated FRU, and wherein the hot swap control signals are communicated wirelessly to each said actuation system.

* * * * *